United States Patent [19]

Glass

[11] Patent Number: 4,493,819
[45] Date of Patent: Jan. 15, 1985

[54] CERAMIC STRONTIUM FERRITE BORATE

[75] Inventor: Howard L. Glass, Orange, Calif.

[73] Assignee: Rockwell International Corporation, El Segundo, Calif.

[21] Appl. No.: 519,797

[22] Filed: Aug. 3, 1983

[51] Int. Cl.³ .............................................. C01B 33/20
[52] U.S. Cl. ................................ 423/277; 252/62.58; 252/62.63; 423/594; 423/596
[58] Field of Search ........................ 423/277, 594, 596; 252/62.58, 62.63

[56] References Cited

U.S. PATENT DOCUMENTS 4,117,058  9/1978  Micheli ............................ 252/62.58

OTHER PUBLICATIONS

Andlauer et al., "Optical and Magneto-Optical Properties," Applied Physics, 10, 189–201, (1976).
Beretka et al., "Studies on the Reaction Between Strontium Carbonate and Iron (III) Oxide," Aust. J. Chem., 1971, 24, 237–42.
Linares, "Growth of Yttrium–Iron Garnet from Molten Barium Borate," J. Amer. Ceram. Soc., 45[7], 307–310, (1962).
Lucchini et al., "The Crystal Structure of $\alpha$-$Sr_3Fe_2O_{7-x}$," Acta Cryst., (1973), B29, 2356–2357.
Tokar, "Microstructure and Magnetic Properties of Lead Ferrite," J. Amer. Ceram. Soc., 52[6], 302–306, (1969).
Haberey et al., "The Formation of Strontium Hexaferrite $SRFE_{12}O_{19}$ From Pure Iron Oxide and Strontium Carbonate," IEEE Transactions on Magnetics, vol. MAG-12, No. 6, Nov. 1976, pp. 983–985.

Primary Examiner—Gary P. Straub
Assistant Examiner—Jackson Leeds
Attorney, Agent, or Firm—Gilbert H. Friedman; H. Fredrick Hamann

[57] ABSTRACT

A new compound consisting essentially of strontium, iron, boron and oxygen is termed strontium ferrite borate or corabelleite. A method for preparing polycrystalline ceramic corabelleite is disclosed.

1 Claim, 1 Drawing Figure

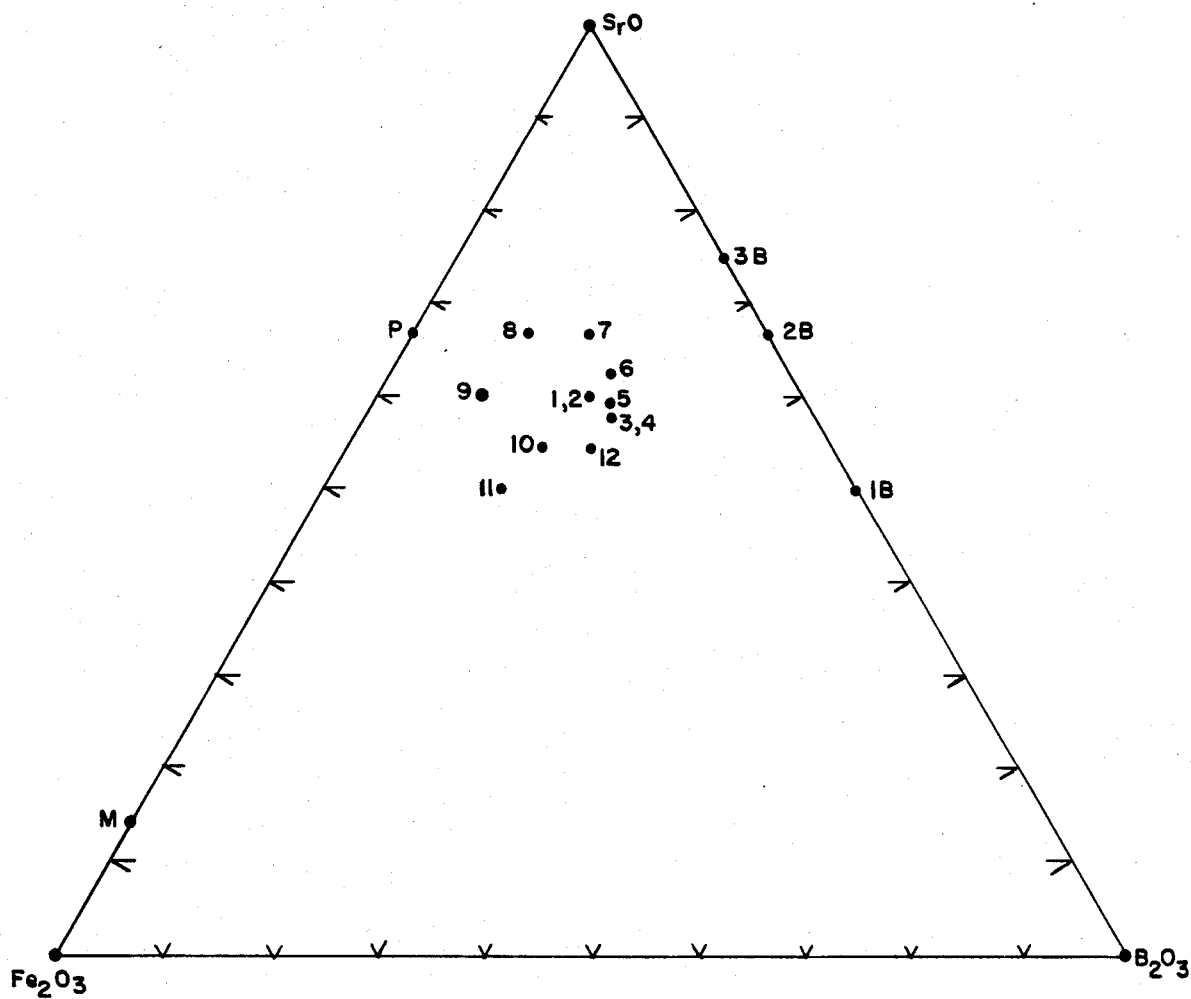

CERAMIC STRONTIUM FERRITE BORATE

LICENSE RIGHTS

This invention was made with Government support under Contract F49620-82-C-0081 awarded by the U.S. Air Force. The Government has certain rights in this invention.

RELATED APPLICATION

This application is related to U.S. patent application Ser. No. 519,796, A STRONTIUM FERRITE BORATE, filed concurrently herewith and assigned to Rockwell International Corporation, the assignee herein. Said related application is incorporated herein by reference.

BACKGROUND OF THE INVENTION

1. Field of the Invention

This invention relates to ferrites and, more particularly, pertains to a new strontium ferrite borate.

2 Description of the Prior Art

As used herein, the term ferrite refers to compounds which can be described as oxides that contain iron (Fe) as a major constituent. Ferrites often have useful magnetic properties. For example, strontium hexaferrite, $SrO.6Fe_2O_3$ or $SrFe_{12}O_{19}$, is an important material used in permanent magnets.

Closely related to strontium hexaferrite are barium hexaferrite and lead hexaferrite. As pointed out by Tokar, these three compounds form a continuous series of substitutional solid solutions. Thus, for example, lead (Pb) can replace strontium (Sr) in any proportion.

Besides permanent magnets, ferrites are used in such diverse applications as microwave and millimeter-wave devices, magneto-optical devices, and computer memories (core memories, magnetic tape, magnetic discs). Some ferrite applications require that the material be in single crystal form. Other applications can use, or may require, a polycrystalline or ceramic form.

Another kind of ferrite is iron borate, $FeBO_3$. As pointed out by Andlauer et al, this material is one of only two known compounds which combine optical transparency in the visible spectrum with spontaneous magnetization at room temperature. Therefore, iron borate is of interest for magneto-optical devices.

Polycrystalline or ceramic ferrites are usually prepared by sintering. In this process, high temperatures are used to obtain solid state reactions and densification of mixtures of finely divided powders. The powders are usually oxides of the metallic constituents of the desired ferrite although sources of the oxides may also be used such as, for example, the carbonates or nitrates of the metallic constituents.

Sometimes a small amount of an additional component is added to the mixture of powders as a sintering aide. For example, Tokar has described the use of boron oxide in amounts less than two weight percent as a sintering aide for the preparation of hexagonal ferrites. Part of the function of the boron oxide is to provide a low melting point phase which permits a liquid phase sintering process to operate. The presence of the small amount of liquid phase speeds the reaction and may permit the use of lower sintering temperatures.

SUMMARY OF THE INVENTION

The literature contains many references to compounds in the strontium oxide-iron oxide-boron oxide system. These compounds are either single oxides (the individual strontium, iron or boron oxides) or double oxides (strontium ferrites, strontium borates or iron borates). There are no known references to any triple oxide of strontium, iron and boron. However, in the related patent application mentioned above, the growth of single crystals of a strontium ferrite borate having the composition $3SrO.Fe_2O_3.B_2O_3$ is described. The single crystals were grown from a flux which contained PbO. As a result, the crystal contained significant amounts of Pb. This patent application describes the preparation of Pb-free polycrystalline or ceramic strontium ferrite borate. This material is referred to by the name corabelleite.

This invention provides a polycrystalline or ceramic strontium ferrite borate material which is an oxide containing only three major metallic constituents: strontium, iron and boron. The material is prepared by a kind of liquid phase sintering process. However, because of the high proportion of boron oxide, the amount of liquid phase is extensive. In fact, in the preferred embodiment, complete melting occurs so the process can be called fusion. The resulting material consists primarily of strontium ferrite borate, i.e., corabelleite, which is believed to have the composition $3SrO.Fe_2O_3.B_2O_3$.

BRIEF DESCRIPTION OF THE DRAWING

The FIGURE is a composition diagram for the $SrO$-$Fe_2O_3$-$B_2O_3$ system.

DESCRIPTION OF THE PREFERRED EMBODIMENT

In a preferred embodiment, finely divided powders of strontium carbonate ($SrCO_3$), iron oxide ($Fe_2O_3$) and boron oxide ($B_2O_3$) are mixed together in the molar ratios 3:1:1. Dry grinding is a suitable method for mixing the powders. After mixing, the powders are placed in a (covered) platinum dish, placed in a furnace and presintered in air, first at about 788° C. then at about 987° C. Presintering times are not critical. One hour at the lower temperature and two hours at the higher temperature are sufficient. After presintering, the powders are removed from the platinum dish and are ground to form a well mixed, fine powder. The powder is then returned to the (covered) platinum dish and placed in a furnace and sintered in air at a temperature which is sufficient to cause complete (or nearly complete) melting of the material. A temperature of 1166° C. is sufficient. Sintering time is not critical. Two or three hours is adequate. When removed from the furnace, the molten material will freeze into a dense mass which consists primarily of corabelleite.

If we assume that all of the iron is in the form of Fe 3+, then the chemical analysis gives the following basic formula for a Pb-free form of this strontium ferrite borate:

$3SrO.Fe_2O_3.B_2O_3.$

It is known from the work by Lucchini et al and others that there exists a different compound which is a borate-free stontium ferrite in which the iron can be in 3+ or 4+ form. The chemical formula of this borate-free strontium ferrite is

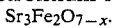

$Sr_3Fe_2O_{7-x}.$

In this formula, $x=0$ if all the iron is in the 4+ form; $x=1$ if all the iron is 3+ form; x has values between 0 and 1 if some of the iron is 3+ and some 4+. In this command, x=0 may be considered the normal (fully oxidized) condition. The value of x will deviate from zero if there is an oxygen deficiency. For example, if the compound is heated in an atomosphere which is not sufficiently rich in oxygen, some oxygen atoms will leave the material. The resulting oxygen vacancies in the crystal structure will cause some of the iron to be reduced in valence form 4+ to 3+.

A far more common case is oxygen deficiency causing reduction of 3+ iron to 2+. This is more common in the sense that compounds having iron mainly in the 3+ state are far more common than compounds having iron in the 4+ state. In part this is related to crystal structure since there is an interrelationship between the crystal structure and the number of oxygen atoms which are available to each iron atom.

At the present time, knowledge of the crystal structure and crystal chemistry of this new strontium ferrite borate is not sufficient to ascertain the valence state of the iron. Considering the conditions of formation, moderate temperatures in air (rather than in vacuum of in pure oxygen), it is probable that the iron is essentially all in the 3+ state. Thus, the formula has been written $$3SrO \cdot Fe_2O_3 \cdot B_2O_3.$$

To allow for the possibility that some of the iron is 2+ or 4+, it may be convenient to use a modification of the formula for the Luccini et al compound; namely, $$Sr_3Fe_2O_{7-x} \cdot B_2O_3.$$

In this formula x will take on values between 0 and 1 if the valence of iron varies between 4+ and 3+. If the valence is iron varies between 3+ 1 and 2+, then x will take on values between 1 and 2.

EXAMPLE I 7.3815 grams of strontium carbonate ($SrCO_3$), 2.6615 grams of iron oxide ($Fe_2O_3$) and 1.1603 grams of boron oxide ($B_2O_3$) were weighed. These starting materials were powders of reagent (or higher) grade. The weights correspond to mole ratios $SrO:Fe_2O_3:B_2O_3$ of 3:1:1. The boron oxide content, 10.4 weight percent, is an order of magnitude greater than when boron oxide is used merely as a sintering aide. The powders were mixed by grinding them together. No lubricant or grinding aide was used. The grinding was fairly brief and was not intended to provide the maximum homogenization since further grinding would be performed after presintering.

The mixed powders were placed in a platinum dish, covered with a platinum lid and placed in the sintering furnace. Presintering was carried out in air in four steps. The first step was for 42 hours at 788° C. At the end of this step the sample was examined visually and was weighed. The weight loss was 2.19 grams. Since the original amount of strontium carbonate contained 2.20 grams of carbon dioxide, it appears that the first presintering step was sufficient to decompose the strontium carbonate leaving strontium oxide in the mixture. Except for this weight loss, there was little evidence of reaction. The mixture had a red color similar to that of the starting mixture. The color comes from the iron oxide; the other two initial components being white. There were a few white specks which were probably due to incomplete mixing of the starting materials. There were a few black patches which may have been iron oxide that had undergone a phase transformation.

The second presintering step was for 1 hour at 886° C. in air. No further changes in appearance were observed. The third step was for 1 hour at 987° C. in air. After this step the material was no longer red. It was a mixture of black material and a dark ochre material. The powder had begun to agglomerate. The fourth presintering step was for an additional hour at 987° C. in air. This did not produce any noticeable changes in appearance. The total weight loss during the four presintering steps was 2.28 grams which is slightly more than the expected loss due to carbon dioxide evolution.

The presintered material was removed from the platinum dish and ground in a mortar and pestle without the use of any lubricant of grinding aide. The material was dark grey and magnetic; that is, it was attracted to a magnet. (The starting mixture was not magnetic.) About 0.2 grams were removed for X-ray diffraction analysis. The remainder was returned to the platinum dish, covered and placed in the furnace for sintering.

Sintering was carried out in two steps. The first step was for 70 minutes at 1166° C. in air. At the end of this step the sample was removed from the furnace. The material appeared to have undergone extensive melting. The second step was for an additional 110 minutes at 1166° C. in air. This brought the total sintering time to 3 hours. The appearance at the end of the second step was similar to that at the end of the first sintering step. A thin green halo surrounded the solidified mass. Probably this was produced by the molten material wetting the platinum.

The solidified material was broken free from the platinum dish in several pieces. The massive material was dark grey, similar to many ferrites in appearance. When ground, the material was yellowish-green or olive green. The powder was magnetic, but not strongly magnetic. The presintered material had been more strongly magnetic. Portions of the powder were taken for X-ray diffraction measurements. Chunks of the solidified material were used for picnometric measurements of density. The density was found to be 4.3 grams per cubic centimeter.

The X-ray diffraction measurements showed marked differences between the presintered (978° C.) and sintered (1166° C.) materials. The presintered materials consisted mainly of $3SrO \cdot B_2O_3$ and $SrO \cdot 6Fe_2O_3$. Also, there were small amounts of $2SrO \cdot B_2O_3$ and a cubic strontium ferrite. The diffraction pattern of this cubic strontium ferrite was similar to the patterns reported by Haberey & Kockel and by others cited by them. Following Haberey & Kockel's notation, this phase may be described as perovskite-like with chemical formula $SrFeO_{3-x}$, where the variable oxygen content represents oxygen vacancies in combination with variable valence of Fe. The presintered material also seemed to contain a very small amount of the strontium ferrite borate phase as indicated by two diffraction lines which are among the strongest lines in the pattern obtained from a powdered sample of single crystal strontium ferrite borate; (see the related patent application).

The sintered material gave a diffraction pattern which consisted mainly of the strontium ferrite borate phase described in the related patent application. The only significant difference between this sintered corabelleite pattern and the pattern obtained from powdered single crystal corabelleite was in the value of lattice parameter. Using standard extrapolation methods to analyze the diffraction lines at large angles, the sintered material was found to have a lattice parameter of 15.164 angstroms, while samples from flux grown single crystals gave values clustered around 15.18 angstroms. This is a significant difference which may be related to the presence of Pb as an impurity in the flux grown materials. The diffraction pattern of the sintered material also revealed the presence of the perovskite-like strontium ferrite phase as a minor constituent. There also were traces of other phases, probably $3SrO \cdot B_2O_3$ and $2SrO \cdot B_2O_3$. when a portion of the sintered material was reground and sintered at 1166° C. for an additional $3\frac{1}{2}$ hours, the diffraction pattern showed that these trace phases were no longer present.

It should be noted that compounds which contain large amounts of $B_2O_3$, especially in combination with an alkaline earth oxide such as SrO, often are glassy rather than crystalline. Such phases give diffuse X-ray diffraction patterns which may not be discernable when the glassy phase is mixed with one or more crystalline phases. It is possible that the sintered material contains a glassy $B_2O_3$-rich phase such as a strontium borate which is not revealed by the X-ray diffraction pattern.

Taking the chemical formula for corabelleite to be $3SrO \cdot Fe_2O_3 \cdot B_2O_3$, the molecular weight is 540.17. Using the value of 15.164 angstroms as the lattice parameter of the cubic unit cell, the measured density of 4.3 grams per cubic centimeter corresponds to 16.7 formula units per unit cell. Probably this value should be rounded down to 16, since it would be unlikely that 17 formula units could be arranged in cubic symmetry. This implies a density of 4.1 grams per cubic centimeter, which may be referred to as the X-ray density.

The difference between the X-ray density and the picnometric density can be accounted for by the presence of the perovskite-like $SrFeO_{3-x}$ second phase. Using the cell dimensions and chemical formula of Gallagher et al and taking 4 of those formula units per unit cell, the density of the perovskite-like phase is estimated to be 4.98 grams per cubic centimeter. Then the difference between the X-ray and picnometric densities of the sintered material would correspond to the second phase making up about 20 weight percent of the material. (This assumes no significant amount of glassy phase.)

This example shows that strontium ferrite borate can be synthesized by sintering a mixture which has the composition $3SrO \cdot Fe B_2O_3$.

EXAMPLE II

A sample was prepared having the same composition as in Example I. Before presintering, the materials were ground using acetone as a lubricant to facilitate grinding and mixing. The acetone was allowed to evaporate before transferrinq the mixture to the platinum dish. Presinterinq was carried out for about 1 hour at each of three temperatures: 788°, 886° and 987° C. The presintered material was a slightly agglomerated, black powder which was mixed by grinding without the use of any lubricant or grinding aide. This reground material was presintered for an additional 2 hours at 987° C. and then for yet another $15\frac{1}{2}$ hours at the same temperature. The resulting black powder was magnetic. An X-ray diffraction pattern showed that it consisted primarily of $3SrO \cdot B_2O_3$ with a significant amount of $SrO \cdot 6Fe_2O_3$. There was one extra diffraction line of low intensity. This line could have been the strongest line of the patterns of $Fe_2O_3$, $FeBO_3$ or the strontium ferrite borate. However, the second strong line of the strontium ferrite borate pattern which was seen in the presintered material of Example I was not detected. Therefore, if the strontium ferrite borate phase was present, its concentration was too low to be positively identified.

After the final 987° C. treatment, the material was ground one more time without the use of any lubricant or grinding aide. The material was then sintered for 2 hours at 1079° C. This sintering produced partial melting and considerable densification. The sintered material was hard and magnetic. The X-ray diffraction pattern showed that the sintered material still consisted mostly of $3SrO \cdot B_2O_3$ and $SrO \cdot 6Fe_2O_3$; but that a small amount of strontium ferrite borate was now present.

This example shows that significant amounts of strontium ferrite borate form when the sintering temperature is high enough to produce some melting. Taken with Example I, it is seen that extensive melting produces greater amounts of strontium ferrite borate.

EXAMPLE III

A sample was weighed and ground similarly to that of Example II except that the $B_2O_3$ content was increased slightly so that the ratios $SrO:Fe_2O_3:B_2O_3$ equalled 3.0:1.0:1.2. Presintering was performed for 1 hour at 788° C. and 24 hours at 987° C. after which the material was a strongly magnetic, lumpy, dark grey powder with a few brown spots.

The presintered material was ground without the use of any lubricant or grinding aide. The reground material was sintered for 30 minutes at 1079° C. The material appeared to have melted completely. (In Example II, which did not have the increased $B_2O_3$ content, only partial melting occurred at this temperature.) The sample was left in the furnace with the power off so that the material could cool slowly. A piece of the resulting solidified mass was removed. It was dark grey in color and was strongly magnetic. X-ray diffraction showed that this material was mostly $3SrO \cdot B_2O_3$ with $SrO \cdot 6Fe_2O_3$ as a major second phase. Strontium ferrite borate was present as a minor phase. Probably, some $2SrO \cdot B_2O_3$ was also present.

The remaining portion of the sample was returned to the furnace for additional sintering at 1166° C. for $2\frac{1}{2}$ hours. When removed from the furnace, the completely melted material solidified into a black, glassy mass. It was not magnetic. X-ray diffraction of a piece of this material failed to show any crystalline phases.

Portions of the material were then heated at 1253° C. for two hours. At this temperature the molten material flowed fairly easily when the platinum dish was tipped. When removed from the furnace the material again solidified into a black, glassy mass. The sample was reheated to 1253° C. and then the furnace temperature was reduced in several steps to about 940° C. over a period of about 24 hours. Then the power was turned off and the sample was allowed to cool in the furnace. This process is essentially the same as the slow-cooling method of crystal growth.

The material which resulted from this slow-cooling consisted of a mass of black, hexagonal, plate-like crystals in a brown matrix. The material was strongly magnetic. X-ray diffraction showed that the material consisted primarily of two phases: $3SrO \cdot B_2O_3$ and $SrO \cdot 6Fe_2O_3$. Only one extra line which might have indicated strontium ferrite borate, or corabelleite, was present in the pattern. Thus, if this phase was present, its concentration was too low to permit positive identification by this method. A separate diffraction pattern of the black, hexagonal crystals identified them as $SrO.6Fe_2O_3$.

This example shows that a glassy phase can form when the composition is near the 3:1:1 ratios. Further, this example shows that strontium ferrite borate can be formed when the $B_2O_3$ proportion is somewhat increased over the 3:1:1 ratios; but that there is proportionately less of this phase than when the ratios are 3:1:1. This example also shows that increasing the $B_2O_3$ proportion reduces the temperature required for complete melting.

This example also seems to show that when the $B_2O_3$ proportion is greater than that of the 3:1:1 ratio, the amount of strontium ferrite borate diminishes as the sintering temperature is increased. Correspondingly, increased sintering temperatures tend to produce a qlassy phase from which little if any strontium ferrite borate crystallizes.

EXAMPLE IV

A sample was prepared similarly to that of Example III. The powders were ground without acetone and were presintered at 788° C. and 987° C. After presintering, the sample was ground, again without acetone, and sintered at 1166° C. for 3 hours. After removing the sample from the furnace, it had a glassy appearance. The sample was returned to the furnace, still at 1166° C., and, after about 25 minutes the power was turned off. The sample was allowed to cool to room temperature in the furnace. The material was black and glossy, but not glassy. Fragments of the material were found to be magnetic. X-ray diffraction showed $3SrO.B_2O_3$ as the primary phase with substantial amounts of $2SrO.B_2O_3$ and $SrO.6Fe_2O_3$. The amount of strontium ferrite borate, if any, was too little to be positively identified.

This example confirms that little or no strontium ferrite borate, or corabelleite, is formed if there is an excessive proportion of $B_2O_3$, even when the maximum temperature is only 1166° C. This example also confirms that another strontium borate, $2SrO.B_2O_3$ can form when the composition is near the 3:1:1 ratios.

EXAMPLE V

A sample was prepared similarly to those of Examples III and IV except that the $Fe_2O_3$ and $B_2O_3$ contents were both reduced slightly although the $B_2O_3$ content was still greater than that of the 3:1:1 proportions. The $SrO:Fe_2O_3:B_2O_3$ ratios were 3.0000:0.9375:1.1250. The ratio $Fe_2O_3 \, B_2O_3$ in this example was the same as in Examples III and IV; namely 1.0:1.2. After presintering the ground powders at 788° C. and 987° C., the reground material was sintered for 6 hours at 1079° C. It appeared that complete melting was produced by this treatment. The solidified mass was magnetic. X-ray diffraction showed that the sintered material consisted primarily of $3SrO.B_2O_3$ with $SrO.6Fe_2O_3$ and strontium ferrite borate as significant second phases.

This example shows that when the $B_2O_3$ content is somewhat greater and the $Fe_2O_3$ content is somewhat less than for the 3:1:1 ratios, the temperature required for melting is reduced and that strontium ferrite borate, or corabelleite, can be obtained. However, the proportion of corabelleite in the final material is less than it is when the 3:1:1 ratio is maintained.

EXAMPLE VI

A sample was prepared having the $Fe_2O_3$ content reduced slightly from the 3:1:1 ratios. The $SrO:Fe_2O_3:B_2O_3$ ratios for this sample were 3.0:0.8:1.0. The materials were mixed by dry grinding and were presintered at 788° C. for 3 hours and then at 987° C. for 4 hours. After presintering the material was dark grey with dark brown spots and was slightly agglomeraged. It was found to be magnetic. The material was ground without using any grinding aides or lubricants. X-ray diffraction of a small portion of the ground material showed that it was a mixture of $3SrO.B_2O_3$, the perovskite-like $SrFeO_{3-x}$, $SrO.6Fe_2O_3$ and $2SrO.B_2O_3$. From the relative intensities of the diffraction lines, the proportions of these four phases decreased in the order given. In addition to these phases, a trace of unreacted $Fe_2O_3$ was probably present. Strontium ferrite borate, if present, was below the levels of positive detection.

The reground presintered material was sintered at 1166° C. for 18 hours. After this treatment, which appeared to have produced complete melting, the material solidified into a dark, dense, strongly magnetic mass with dendritic crystals across the surface. X-ray diffraction showed that this material consisted of $3SrO.B_2O_3$ as the primary phase and $SrO.6Fe_2O_3$ as a second phase. Traces of $2SrO.B_2O_3$ and the perovskite-like $SrFeO_{3-x}$ may have been present. One very weak diffraction line may have been due to a trace amount of strontium ferrite borate or to a trace amount of $Fe_2O_3$. However, if either of these phases was present, its concentration was too low to permit positive identification.

This example shows that if the $Fe_2O_3$ proportion is reduced from that of the 3:1:1 ratios, the amount of corabelleite in the final product is greatly reduced.

EXAMPLE VII

A sample was prepared similarly to those of the previous examples except that the $Fe_2O_3$ and $B_2O_3$ contents were both decreased so that the ratios $SrO:Fe_2O_3:B_2O_3$ were 3.00:0.75:0.75. Note that the ratio $Fe_2O_3:B_2O_3$ was 1:1. After presintering at 788° C. and 987° C., the material was reground and sintered at 1079° C. for 2 hours. This resulted in a slightly agglomerated, dark grey powder. Further sintering was carried out at 1166° C. for 3 hours. Partial melting of the material occurred during this step. The material was broken free from the platinum dish and was qround. The powder was strongly magnetic. X-ray diffraction showed that this material consisted of $3SrO.B_2O_3$ and the cubic perovskite-like strontium ferrite $SrFeO_{3-x}$. One extra diffraction line, which could have been the strongest line of the strontium ferrite borate pattern, was present; however, this was not considered sufficient as a positive indication of this phase. The ground material was sintered again at 1253° C. Complete melting occurred. The material was magnetic. The diffraction pattern was similar to that of the 1166° C. material except that the extra line was stronger and at least one other line attributable to the strontium ferrite borate pattern now appeared. This was considered adequate indication of this phase. This example shows that if the $Fe_2O_3$ and $B_2O_3$ proportions are both reduced from their proportions in the 3:1:1 ratios, corabelleite can still be produced. Melting still seems to be required for formation of this phase and the proportion of this phase is less than it is for the 3:1:1 composition. Also, the temperature required for melting is increased.

EXAMPLE VIII

A sample was prepared in a manner similar to that of the previous examples; however, the $B_2O_3$ proportion was only half that of the 3:1:1 ratios.

The $SrO:Fe_2O_3:B_2O_3$ ratios were 3.0:1.0:0.5. After presintering at 788° C. and 987° C., X-ray diffraction showed that the material consisted almost entirely of $3SrO.B_2O_3$ and the perovskite-like $SrFeO_{3-r}$. If any strontium ferrite borate was present, its concentration was too low to be detected with certainty. The presintered material was reground and then sintered for 3 hours at 1079° C. There was no visible change. The sample was then sintered for 2 hours at 1166° C. It appeared that a slight degree of melting had occurred. X-ray diffraction showed that the material still consisted primarily of $3SrO.B_2O_3$ and the perovskite-like $SrFeO_{3-r}$; however, as indicated by the relative intensities of the diffraction lines, the amount of $3SrO.B_2O_3$ was substantially less than in the 987° C. presintered material. A small but clearly detectable amount of strontium ferrite borate was also present in the 1166° C. sintered material.

The remainder of the sintered material was sintered again at 1253° C. for 2 hours. After this treatment it appeared that more melting (or more liquid phase) was present and there was a slight, greenish halo around the edge of the material as though some of the liquid had wet the platinum dish. The material was returned to the furnace for additional sintering at 1352° C. for 5 hours. After this treatment it appeared that melting still was not complete. X-ray diffraction showed that the material consisted mostly of the perovskite-like $SrFeO_{3-x}$ plus strontium ferrite borate as a minor phase. No $3SrO.B_2O_3$ was detectable.

This example shows that when the $B_2O_3$ proportion is reduced, corabelleite can be produced. However, the proportion of this phase is less than for the 3:1:1 composition. Further the temperature required for melting is increased.

EXAMPLE IX

A sample was prepared similarly to that of Example VIII; however, the $Fe_2O_3$ content was increased so the $SrO:Fe_2O_3:B_2O_3$ ratios were 3.0:1.5:0.5. After presintering at 788° C. and 987° C., the reground material was sintered at 1079° C. for about 2 hours. There was no evidence of any appreciable amount of melting so the material was sintered for an additional 1½ hours at 1166° C. The sample appeared to have melted completely at this temperature. X-ray diffraction of the solidified material showed that it consisted of the perovskite-like $SrFeO_{3-x}$ as the major phase and strontium ferrite borate as a significant minor phase. A trace of $SrO.6Fe_2O_3$ may also have been present. This example shows that corabelleite can be produced when the $B_2O_3$ proportion is less and the $Fe_2O_3$ proportion is more than in the 3:1:1 composition. However, the proportion of this phase in the final product is less than when the composition of the starting mixture is 3:1:1. Also, decreasing the $B_2O_3$ proportion and increasing the $Fe_2O_3$ proportion as in this example does not change the temperature required for melting by a substantial amount.

EXAMPLE X

A sample was prepared similarly to that of Example IX except that the $B_2O_3$ content was restored to its value in the 3:1:1 ratios. The $SrO:Fe_2O_3:B_2O_3$ ratios were 3.0:1.5:1.0. After presintering at 788° C. and 987° C., the material was found to be magnetic and to consist of at least two phases; one (or more) being dark grey and the other (or more) being cream colored. X-ray diffraction showed a rather complex pattern which could be identified as consisting of four principal phases none of which dominated. The four identified phases were $3SrO.B_2O_3$, $2SrO.B_2O_3$, $SrO.6Fe_2O_3$ and the perovskite-like $SrFeO_{3-x}$. $SrO.B_2O_3$ may also have been present in small quantities. If any strontium ferrite borate was present, its concentration was too low to permit positive identification.

The presintered material was ground and then sintered for 1 hour at 1166° C. This was sufficient to cause extensive, possibly complete, melting. The solidified material was partly glassy and partly crystalline in appearance. When ground, the powder was rusty brown in color. X-ray diffraction showed that strontium ferrite borate (corabelleite) was the primary phase present but that $SrO.6Fe_2O_3$ was present as a significant second phase. A small amount of the perovskite-like $SrFeO_{3-x}$ phase was also present.

This example shows that when the $Fe_2O_3$ proportion is increased relative to that of the 3:1:1 ratios, corabelleite still can be produced. Based primarily on the color of the material, the proportion of corabelleite in the final material is less than when the starting composition is in the ratios 3:1:1. However, the fall off in the proportion of this phase is not as rapid as when the proportions deviate from 3:1:1 by increasing the relative proportion of $B_2O_3$. Also, the temperature required for melting is not greatly affected by increasing the $Fe_2O_3$ proportion.

EXAMPLE XI

A sample was prepared similarly to that of Example X except that the $Fe_2O_3$ content was increased further. The $SrO:Fe_2O_3:B_2O_3$ ratios were 3:2:1. Presintering at 788° C. and 987° C. produced a material which was virtually identical to the material of Example X in its appearance and in its X-ray diffraction pattern. The reground presintered material was sintered for 15 hours at 1079° C. It appeared that this treatment produced a slight amount of melting. The material was dense but lumpy and there was a greenish stain around the sample where the platinum seemed to have been wet. Part of the sample was ground. The powder was grey and strongly magnetic. X-ray diffraction showed this to be mostly $SrO.6Fe_2O_3$. Some $3SrO.B_2O_3$ was present as a second phase along with a barely detectable trace of strontium ferrite borate.

The ground portion of the material was returned to the platinum dish and sintered a second time. The sintering conditions were 1166° C. for 2 hours. The portion which had been ground into a powder was now a dense, smooth, polycrystalline mass. The unground portion retained its lumpiness. Thus, 1166° C. may not have been sufficient for complete melting; but the melting was extensive. When the twice sintered material was ground, the resulting powder was magnetic, was darker than the 1079° C. material, and had a greenish brown color. X-ray diffraction showed that this material consisted mostly of $SrO.6Fe_2O_3$ with strontium ferrite borate as a significant second phase. At least one other phase was present to a lesser extent, but it could not be identified unambiguously. Probably a trace of $3SrO.B_2O_3$ was present.

This example confirms the conclusions drawn from Example X. Although the proportion of strontium ferrite borate (corabelleite) in the final material diminishes as the $Fe_2O_3$ content is increased relative to the 3:1:1 ratios, this diminution is not very rapid.

EXAMPLE XII

A sample was prepared similarly to those of the previous examples, but with both the $Fe_2O_3$ and the $B_2O_3$ proportions increased relative to the 3:1:1 ratios. The $SrO:Fe_2O_3:B_2O_3$ ratios were 3.00:1.23:1.23. Note that the ratio $Fe_2O_3:B_2O_3$ was 1:1. After presintering at 788° C. and 987° C., the material was magnetic and gave a very complex diffraction pattern. The pattern showed that the major phases present included $SrO.6Fe_2O_3$, $3SrO.B_2O_3$, and $2SrO.B_2O_3$. The perovskite-like $SrFe_{O3}$-x phase and the strontium ferrite borate phase were probably present in very small amounts. Other phases were probably present as well.

The presintered material was ground and was then sintered at 1166° C. for 16 hours. When removed from the furnace, the material cooled to form a glassy material. The sample was returned to the 1166° C. furnace for nearly two hours and then the power was turned off and the sample was allowed to cool in the furnace. The resulting material was dense, black and magnetic. X-ray diffraction showed that the material consisted mainly of $3SrO.B_2O_3$ and $SrO.6Fe_2O_3$ with some $2SrO.B_2O_3$ A small amount of the perovskite-like SrFe03-x phase was probably present. If any strontium ferrite borate (corabelleite) was present, the amount was too small to permit positive identification. This example shows that if both the $Fe_2O_3$ and the $B_2O_3$ proportions are increased relative to the 3:1:1 composition, the proportion of strontium ferrite borate (corabelleite) in the final product is quickly diminished.

EXAMPLE XIII

A sample was prepared just like that of Example I except that the initial grinding was carried out long enouqh to produce a powder of uniform color. No presintering was performed. The sample, in its covered platinum dish, was placed directly into a hot furnace which had been equilibrated at 1166° C. Some cooling occurred during introduction of the sample, but the measuring thermocouple indicated that thermal equilibrium was again attained after the sample had been in the furnace for a few minutes. After 2 hours the power was turned off and the sample was removed from the furnace. The sample appeared to have melted completely during the sintering. It solidified into a dense mass which was almost glassy in appearance. Thin greenish deposits were seen in places where the material seemed to have wet the platinum. X-ray diffraction of a ground portion of the solidified mass was virtually identical to the pattern of the sintered material of Example I, except that lines of the trace phases, $3SrO.B_2O_3$ and $2SrO.B_2O_3$, were weaker.

This Example shows that the presintering step can be omitted. However, presintering may be desirable as a means of assuring homogeneity.

Taken together, the examples show that strontium ferrite borate, or corabelleite, can be prepared in polycrystalline or ceramic form by sintering a mixture which has a composition close to that of the molar ratios 3:1:1 of $SrO:Fe_2O_3$ $B_2O_3$. Further, the examples show that as the proportions deviate from 3:1:1, the proportion of corabelleite in the final product is reduced. The rate at which this reduction occurs is relatively rapid if the deviation is in the direction of increased $B_2O_3$ content. The reduction occurs relatively slowly if the deviation is in the direction of increased $Fe_2O_3$ content. In addition, even when the composition is suited to the production of strontium ferrite borate, substantial amounts of this phase are produced only when substantial melting occurs during the sintering. It appears that the starting oxides react during presintering to produce double oxides (strontium borates and strontium ferrites). At higher temperature, where melting occurs, the double oxides react to form the triple oxide strontium ferrite borate. Presumably, it is the strontium borate portion which melts and acts as a solvent for the strontium ferrite portion.

The Figure is a composition diagram for the $SrO$-$Fe_2O_3$—$B_2O_3$ system. Each point within the triangle represents a mixture of these three oxides. The three vertices represent the three single oxides. Points along the edges of the triangle represent all possible double oxides: strontium borates, strontium ferrites, iron borates. Some of these double oxides are indicated. $SrO.6Fe_2O_3$, strontium hexaferrite, is shown by the letter "M" (which symbolizes the magnetoplumbite crystal structure of this compound.) $SrFeO_{3-x}$, the perovskite-like strontium ferrite, is shown by the letter "P". Three strontium borates, $SrO.B_2O_3$, $2SrO.B_2O_3$ and $3SrO.B_2O_3$ are shown by the symbols "1B", "2B", and "3B", respectively. The composition diagram is drawn under the assumption that the iron is in the form $Fe_2O_3$; that is, the Fe atoms are all in the 3+valence state. Thus the perovskite-like $SrFeO_{3-x}$ has x=0.5. The possibility of variable oxygen content and variable Fe valence should be kept in mind. The diagram is, however, convenient because it represents all possible combinations of the starting materials. The diagram is plotted in units of mole percent so that it makes no difference whether one considers the source of SrO to be SrO itself or the $SrCO_3$ which was actually used.

Points that lie in the interior of the triangle represent all possible triple oxides. Ten specific points are indicated. The numbers next to these points designate the Examples which had the corresponding compositions. The point labeled 1,2 has the molar ratios $SrO:Fe_2O_3:B_2O_3$ equal to 3:1:1. The points labeled 3,4 and 8 correspond to compositions having greater or lesser proportions of $B_2O_3$ than in the 3:1:1 ratios case. Similarly, the points labeled 11, 10 and 6 have greater or lesser proportions of $Fe_2O_3$ than in the 3:1:1 ratios case. The points labeled 7 and 12 have qreater or lesser proportions of SrO than in the 3:1:1 ratios case.

EXAMPLE XIV

A sample was prepared similarly to the previous examples. The $SrO:Fe_2O_3:B_2O_3$ molar ratios were 3:1:1. After presintering at 788° C. and 987° C., the material was reground and was sintered at 1342° C. for 3 hours. The sample was then removed from the furnace. It appeared to have been completely melted. The sample cooled and formed a solid which looked glassy in some portions. The solidified material was slightly magnetic. Its X-ray diffraction pattern was virtually identical to that of the material in Example I after sintering at 1166° C.; however, the diffraction lines at large diffraction angles were slightly broadened. Thus, sintering at 1342° C. yields a material consisting mainly of strontium ferrite borate but also containing some of the perovskite-like $SrFeO_{3-x}$ phase.

Another sample of the same composition was prepared in the same manner except that the presintering and regrinding steps were omitted. The materials after being mixed by dry grinding were placed directly into the hot furnace and sintered at 1341° C. for slightly over 3 hours. The sample was removed from the furnace. The material appeared to have melted completely. On cooling, the material solidified into a mass which appeared to be glassy. However, when a portion of the material was removed, it was found to be magnetic and its diffraction pattern was virtually identical to that of the 1166° C. sintered material of Example I except for some broadening of lines at large diffraction angles and, possibly, slightly lower overall intensity of the diffraction lines. Thus, even without the presintering and regrinding steps, sintering at 1341° C. yields a material which consists mainly of strontium ferrite borate but also contains some of the perovskite-like $SrFeO_{3-x}$.

The remaining portion of the sintered material was returned to the furnace, reheated to 1344° C. and held at that temperature for about 1 hour. Presumably, the material was completely melted. The power was then turned off and the sample was allowed to cool in the furnace. This is a much slower rate of cooling than when the sample is removed from the furnace. After cooling to 468° C., the sample was removed from the furnace. It had a dense, crystalline appearance, and was strongly magnetic. Its X-ray diffraction pattern was very complex. $SrO.6Fe_2O_3$ was identified as the major phase. $2SrO.B_2O_3$ was identified as a significant phase. Other phases also were present but could not be identified with certainty. If strontium ferrite borate was present, its concentration was too low to permit positive identification.

This example shows that strontium ferrite borate is formed when the sample is rapidly cooled after sintering but that this phase is not present or is present in greatly reduced proportion if the sample is slowly cooled.

It will be recognized by those skilled in the art that, in each of the above examples, each oxide in the fluxed melt could be derived from another compound such as, for example, a carbonate or a nitrate which decomposes to form the oxide at the temperatures required for melting.

What is claimed is:
1. A compound of the formula

$$Sr_3Fe_2O_{7-x}.B_2O_3,$$

wherein said compound has a cubic crystal structure of lattice constant approximately 15.2 angstroms, wherein x can vary from zero to two to account for the variation in oxygen content associated with the variable valence of iron.

* * * * *